United States Patent

Hayashida et al.

Patent Number: 6,013,201
Date of Patent: Jan. 11, 2000

[54] SEMICONDUCTIVE SILICONE RUBBER COMPOSITIONS AND SEMICONDUCTIVE SILICONE RUBBER ROLLS

[75] Inventors: Osamu Hayashida; Tsutomu Nakamura, both of Usui-gun, Japan

[73] Assignee: Shin-Estu Chemical Co., Ltd., Japan

[21] Appl. No.: 09/084,164

[22] Filed: May 26, 1998

[30] Foreign Application Priority Data

May 23, 1997 [JP] Japan ................................. 9-150418
Aug. 25, 1997 [JP] Japan ................................. 9-243359
Dec. 24, 1997 [JP] Japan ................................. 9-366501

[51] Int. Cl.$^7$ .............................. H01B 1/24; B25F 5/02; C08K 3/04
[52] U.S. Cl. ..................... 252/511; 524/496; 428/36.9; 428/447; 492/56; 492/59
[58] Field of Search ............................. 252/510, 511; 428/36.9, 36.92, 447, 450; 492/53, 56, 59; 524/496, 495, 847

[56] References Cited

U.S. PATENT DOCUMENTS 5,135,980  8/1992  Watanabe ............................ 524/496
5,164,443  11/1992 Watanabe ............................ 524/495
5,449,714  9/1995  Inoue et al. ........................... 524/495
5,725,922  3/1998  Nakamura et al. .................. 428/36.9

Primary Examiner—Mark Kopec
Assistant Examiner—Derrich G. Hamlin
Attorney, Agent, or Firm—Millen, White, Zelano, & Branigan, P.C.

[57] ABSTRACT

In a silicone rubber composition comprising an organopolysiloxane having at least two aliphatic unsaturated groups and a curing agent, thermal black and/or furnace black having a primary particle diameter of 50–500 nm and a DBP oil absorption of 20–50 cc/100 g is blended. There may be further blended an organopolysiloxane having an ionic group-bearing portion as an antistatic agent and/or a hydrocarbon insulating oil. The composition has a stable resistivity in the semiconductive region and thus is useful as semiconductive rolls.

19 Claims, 1 Drawing Sheet

SEMICONDUCTIVE SILICONE RUBBER COMPOSITIONS AND SEMICONDUCTIVE SILICONE RUBBER ROLLS

BACKGROUND OF THE INVENTION

1. Field of the Invention

This invention relates to a semiconductive silicone rubber composition which cures into a silicone rubber having a stable electrical resistivity in the semiconductive region and thus is useful as semiconductive rolls such as charging rolls, transfer rolls and developing rolls in business machines such as copying and facsimile machines. It also relates to a semiconductive silicone rubber roll.

2. Prior Art

In the field of business machines, a variety of rubber materials including silicone rubbers, urethane elastomers, ethylene-propylene rubbers, and natural rubber are currently used to form rolls while composite materials of these rubbers are also available. The rubber materials are used in a variety of applications as electrically insulating materials, and with conductive agents added, they are also used as electroconductive materials for anti-static and electric conduction purposes. Nowadays, semiconductive materials having an intermediate resistivity range of $1 \times 10^3$ to $1 \times 10^{12}$ Ω-cm are increasingly used as roll materials for copying machines or the like. For semiconductive roll materials, the stability of resistivity is very important in most service environments where it is desirable to control current flow by the resistivity of the rubber material itself, for example, in order to impart an appropriate transfer ability. Also a high voltage of about 100 volts to 10 kilovolts is often applied across a semiconductive roll material in order to stabilize the current flow across the roll material or to provide a proper electric charge to an organic photoconductor (OPC) drum.

Most semiconductive roll materials use conductive carbon. For example, JP-A 306289/1994 uses furnace carbon black having a specific surface area of 25 to 50 m²/g, a DBP oil absorption of 100 to 150 cc/100 g, and a toluene colored transmittance of 90 to 100%. JP-A 62241/1995 uses furnace carbon black having a ΔDBP of 40 to 150 cc/100 g and a Dmod diameter of 250 to 400 nm Note ΔDBP is a difference between a DBP oil absorption according to JIS K-6221 and a 24M₄DPB oil absorption according to ASTM D3493 which is a DBP oil absorption after compression, and the Dmod diameter is a diameter of carbon agglomerates.

However, use of carbon as the conductive agent has the problem that the stability of carbon is limited under the service environments of high voltages. For example, the carbon-to-carbon structure can be cleaved. Due to vaporization of carbon, the resistivity will deviate from the preset value during long-term use. These problems become outstanding as the voltage is increased and as the current is conducted more and more.

When conventional conductive carbon black is used, it is known that the current-to-voltage does not follow Ohm's law and becomes nonlinear due to the tunnel effect of the carbon structure (see L. K. H. van Beek and B.I.C.F. van Pul, J. Appl. Polymer Sci., 6, 651 (1962)). This nonlinear current-to-voltage is inadequate for OPC-related rolls including developing rolls and transfer rolls whose resistivity must be precisely controlled within the semiconductive region. As a solution to this problem, JP-A 192486/1994 discloses the addition of phosphates and JP-A 86205/1988 discloses the use of potassium titanate whiskers. These are not satisfactory in solving the above-mentioned current-to-voltage relationship.

SUMMARY OF THE INVENTION

An object of the invention is to provide a semiconductive silicone rubber composition which has a stable resistivity under high voltages, affords an approximately linear current-to-voltage relationship under high voltages and is thus suitable as a roll material.

Another object of the invention is to provide an improved semiconductive silicone rubber roll.

We have found that when a silicone rubber composition comprising an organopolysiloxane having at least two aliphatic unsaturated groups in a molecule and represented by the following average compositional formula (1):

$$R^1_n SiO_{(4-n)/2} \qquad (1)$$

wherein $R^1$, which may be identical or different, is a monovalent hydrocarbon group and letter n is a positive number of 1.98 to 2.02, and a curing agent is blended with thermal black and/or furnace black having a primary particle diameter of at least 50 nm and a DBP oil absorption of up to 50 cc/100 g, there is obtained a silicone rubber composition which is suitable as a roll material for business machines because of improved workability and compression set, stable semiconducting properties, stability against a change of resistivity under application of high voltages, and long-lasting service life. By the term "semiconductive" used herein, it is meant that the silicone rubber has a resistivity in the range of $1 \times 10^3$ to $1 \times 10^{12}$ Ω-cm.

More particularly, by blending 100 parts by weight of the organopolysiloxane of average compositional formula (1) with 2 to 200 parts by weight of thermal black and/or furnace black having a primary particle diameter of at least 50 nm and a DBP oil absorption of up to 50 cc/100 g, there is obtained a semiconductive silicone rubber composition which can be cured with an organic peroxide and/or an organohydrogenpolysiloxane/platinum catalyst. Since this system prevents deterioration of the conductive agent under application of high voltages, a molded product of this composition experiences a minimal change of resistivity and withstands long-term use. It is thus best suited as the roll material for use in business machines.

As described in the preamble, the use of conductive carbon in semiconductive roll materials is well known and the use of furnace carbon black is already proposed in the prior art. We have found that among a variety of carbon blacks, thermal black and furnace black having a primary particle diameter and a DBP oil absorption in the above-specified ranges are effective for producing silicone rubber rolls which are quite stable against a change of resistivity as compared with carbon blacks having a primary particle diameter and a DBP oil absorption outside the above-specified ranges (e.g., acetylene black and Ketjen black), which will be demonstrated in Examples later.

We have further found that when 0.1 to 60 parts by weight of an organopolysiloxane represented by the following average compositional formula (3):

$$R^3_a SiO_{(4-a)/2} \qquad (3)$$

wherein $R^3$, which may be identical or different, is a monovalent hydrocarbon group free of an aliphatic unsaturated bond, and letter a is a positive number of 1.98 to 2.02, 0.1 to 100 mol % of the entire $R^3$ groups being phenyl groups, is further blended in the above composition per 100 parts by weight of the organopolysiloxane of formula (1), the phenyl-containing organopolysiloxane of formula (3) serves as a coordinator between the organopolysiloxane of formula (1) and the carbon black to assist in dispersing the carbon black. Then the carbon black is blended in a more stable manner. This prevents the deterioration of conductive silicone rubber under high voltages, reduces the resistivity change, and imparts stable semiconductivity, providing a silicone rubber roll capable of withstanding long-term use.

Accordingly, in a first aspect of the invention, there is provided a semiconductive silicone rubber composition comprising (A) 100 parts by weight of an organopolysiloxane having at least two aliphatic unsaturated groups in a molecule and represented by the following average compositional formula (1):

$$R^1{}_n SiO_{(4-n)/2} \qquad (1)$$

wherein $R^1$, which may be identical or different, is a monovalent hydrocarbon group and letter n is a positive number of 1.98 to 2.02, (B) 2 to 200 parts by weight of thermal black and/or furnace black having a primary particle diameter of at least 50 nm and a DBP oil absorption of up to 50 cc/100 g, and (C) an amount to cure component (A) of a curing agent.

In one preferred embodiment, the semiconductive silicone rubber composition further contains (D) 0.1 to 60 parts by weight of an organopolysiloxane represented by the following average compositional formula (3):

$$R^3{}_a SiO_{(4-a)/2} \qquad (3)$$

wherein $R^3$, which may be identical or different, is a monovalent hydrocarbon group free of an aliphatic unsaturated bond, and letter a is a positive number of 1.98 to 2.02, 0.1 to 100 mol % of the entire $R^3$ groups being phenyl groups.

The composition is molded and cured into a semiconductive silicone rubber roll. When a foaming agent is added to the composition, a silicone rubber sponge is obtained.

We have further found that when a silicone rubber composition comprising an organopolysiloxane of formula (1) and a curing agent is blended with thermal black and/or furnace black having a primary particle diameter of at least 50 nm and a DBP oil absorption of up to 50 cc/100 g and an antistatic agent in the form of an organopolysiloxane having an ionic group-bearing portion in a molecule or a hydrocarbon insulating oil, there is obtained a silicone rubber composition which is suitable as a roll material for business machines because of improved workability and compression set, stable semiconducting properties, stability against a change of resistivity under application of high voltages, and long-lasting service life.

More particularly, by blending the organopolysiloxane of average compositional formula (1) with the specific thermal black and/or furnace black and the antistatic agent or the hydrocarbon insulating oil, there is obtained a semiconductive silicone rubber composition which can be cured with an organic peroxide and/or an organohydrogenpolysiloxane/platinum catalyst. Since this system prevents deterioration of the conductive agent under application of high voltages, a molded product of this composition experiences a minimal change of resistivity and withstands long-term use. It is thus best suited as the roll material for use in business machines.

Accordingly, in second and third aspects of the invention, there is provided a semiconductive silicone rubber composition comprising (A) 100 parts by weight of an organopolysiloxane having at least two aliphatic unsaturated groups in a molecule and represented by the following average compositional formula (1):

$$R^1{}_n SiO_{(4-n)/2} \qquad (1)$$

wherein $R^1$, which may be identical or different, is a substituted or unsubstituted monovalent hydrocarbon group and letter n is a positive number of 1.98 to 2.02, (B) 2 to 100 parts by weight of thermal black and/or furnace black having a primary particle diameter of at least 50 nm and a DBP oil absorption of up to 50 cc/100 g, (C) an amount to cure component (A) of a curing agent, and (E) 0.1 to 10 parts by weight of an antistatic agent in the form of an organopolysiloxane having an ionic group-bearing portion in a molecule or (F) 0.1 to 10 parts by weight of a hydrocarbon insulating oil.

BRIEF DESCRIPTION OF THE DRAWINGS

The only figure, FIG. 1 schematically illustrates how to measure the resistivity of a semiconductive silicone rubber.

DETAILED DESCRIPTION OF THE PREFERRED EMBODIMENT

Figure 1:
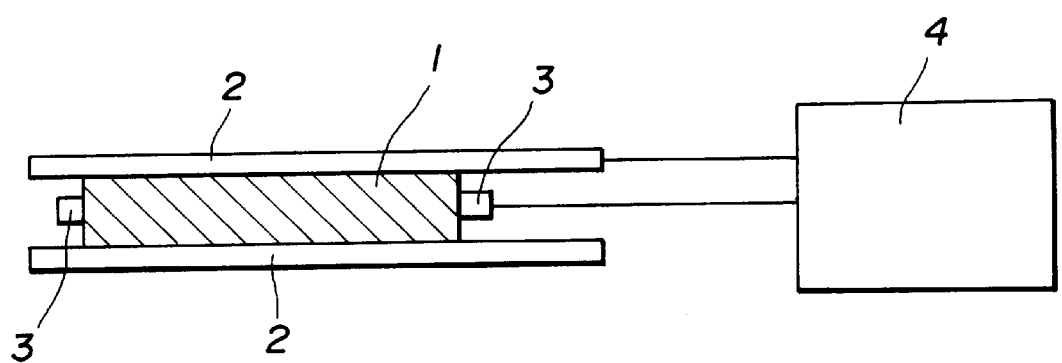

A first essential component (A) of the silicone rubber composition according to the first aspect of the invention is an organopolysiloxane of the following average compositional formula (1):

$$R^1{}_n SiO_{(4-n)/2} \qquad (1)$$

wherein $R^1$, which may be identical or different, is a monovalent hydrocarbon group and letter n is a positive number of 1.98 to 2.02.

More particularly, $R^1$ is independently selected from substituted or unsubstituted monovalent hydrocarbon groups having 1 to 10 carbon atoms, more preferably 1 to 8 carbon atoms, for example, alkyl groups such as methyl, ethyl, propyl and butyl; cycloalkyl groups such as cyclohexyl; alkenyl groups such as vinyl, allyl, butenyl and hexenyl; aryl groups such as phenyl and tolyl; and substituted ones of these groups wherein some or all of the hydrogen atoms attached to carbon atoms are replaced by halogen atoms, cyano groups or the like, such as chloromethyl, trifluoropropyl and cyanoethyl. Of these, methyl and phenyl are especially preferred. There should be contained at least two aliphatic unsaturated groups, typically alkenyl groups as $R^1$. An aliphatic unsaturated group should preferably be contained in an amount of 0.001 to 20 mol %, especially 0.025 to 5 mol % of the entire $R^1$ groups. The preferred alkenyl group is vinyl. Letter n is a positive number of 1.98 to 2.02.

Most often, the organopolysiloxane of formula (1) is preferably linear, but may be partially branched. A mixture of two or more organopolysiloxanes having different molecular structures is also acceptable. The organopolysiloxane preferably has an average degree of polymerization of about 100 to 20,000, especially about 3,000 to 10,000.

A second essential component (B) of the silicone rubber composition according to the invention is carbon black which may be either thermal black or furnace black as long as it has a primary particle diameter of at least 50 nm and a DBP oil absorption of up to 50 cc/100 g. The thermal black is obtained by high-temperature pyrolysis of natural gas and acetylene gas. The furnace black is obtained by partial combustion of natural gas and aromatic oil. The conditions: a primary particle diameter of at least 50 nm and a DBP oil absorption of up to 50 cc/100 g indicate that the structure of carbon black is not well developed, that is, carbon black is less conductive. Such carbon black is unlikely to exert Schottky effect under high voltages and hence, experiences a decreased lowering of resistivity under high voltages.

The primary particle diameter is at least 50 nm, preferably 50 to 500 nm, more preferably 70 to 400 nm, and most preferably 70 to 100 nm. A primary particle diameter of less than 50 nm leads to a substantial lowering of resistivity under high voltages.

The DBP oil absorption, which is an amount of dibutyl phthalate absorbed according to JIS K-6221 (1982), is up to 50 cc/100 g, preferably 20 to 45 cc/100 g, and more preferably 20 to 40 cc/100 g. A DBP oil absorption in excess of 50 cc/100 g suggests that the structure of carbon black is much developed, inviting a substantial lowering of resistivity under high voltages.

Illustrative examples of the carbon black used herein include HTC 20 and HTC SL commercially available from Shin-Nikka Carbon K.K., and Asahi No. 15 and Asahi Thermal commercially available from Asahi Carbon K.K.

The carbon black is blended in an amount of 2 to 200 parts, preferably 10 to 100 parts by weight per 100 parts by weight of organopolysiloxane (A). This range is appropriate to provide a resistivity in the semiconductive range. Compositions containing less than 2 parts of carbon black become substantially insulating, failing to achieve the objects. Compositions containing more than 200 parts of carbon black become too conductive and sometimes lose physical or mechanical properties.

A third essential component (C) of the silicone rubber composition according to the invention is a curing agent which may be selected from well-known organohydrogenpolysiloxane/platinum catalysts (or addition reaction curing agents) and organic peroxide catalysts.

The platinum group metal catalyst used herein may be selected from well-known platinum and similar catalysts. Exemplary platinum catalysts include elemental platinum, platinum compounds, platinum composites, chloroplatinic acid, and complexes of chloroplatinic acid with alcohols, aldehydes, ethers and olefins. The platinum catalyst is desirably added in an amount of 1 to 2,000 ppm of Pt based on the weight of organopolysiloxane (A).

The organohydrogenpolysiloxane has at least two, preferably at least three, hydrogen atoms each attached to silicon atom (SiH groups) in a molecule. It is preferably of the following average compositional formula:

$$R^2{}_b H_c SiO_{(4-b-c)/2} \qquad (2)$$

wherein $R^2$ is as defined for $R^1$, letters b and c are numbers satisfying $0 \leq b<4$, $0<c<4$, and $0<b+c<4$. The organohydrogenpolysiloxane used herein may be linear, cyclic or branched and preferably has an average degree of polymerization of up to about 300. Examples of the organohydrogenpolysiloxane of formula (II) are diorganopolysiloxanes end-blocked with a dimethylhydrogensilyl group, copolymers consisting of dimethylsiloxane units, methylhydrogensiloxane units and terminal trimethylsiloxy units, low viscosity fluids consisting of dimethylhydrogensiloxane $H(CH_3)_2SiO_{1/2}$ units and $SiO_2$ units, 1,3,5,7-tetrahydrogen-1,3,5,7-tetramethylcyclotetrasiloxane, 1-propyl-3,5,7-trihydrogen-1,3,5,7-tetramethylcyclotetrasiloxane, and 1,5-dihydrogen-3,7-dihexyl-1,3,5,7-tetramethylcyclotetrasiloxane.

The organohydrogenpolysiloxane is desirably added as the curing agent in such amounts that 50 to 500 mol % of the hydrogen atom directly attached to a silicon atom is available based on the moles of the aliphatic unsaturated group (alkenyl group) in organopolysiloxane (A).

The organic peroxide catalysts include benzoyl peroxide, 2,4-dichlorobenzoyl peroxide, p-methylbenzoyl peroxide, 2,4-dicumyl peroxide, 2,5-dimethyl-bis(2,5-t-butylperoxy) hexane, di-t-butyl peroxide; and t-butyl perbenzoate. The organic peroxide catalyst may be added in an amount of about 0.1 to 5 parts by weight per 100 parts by weight of organopolysiloxane (A).

In the composition of the invention, another organopolysiloxane is preferably blended as component (D). The other organopolysiloxane is represented by the following average compositional formula (3):

$$R^3{}_a SiO_{(4-a)/2} \qquad (3)$$

wherein $R^3$, which may be identical or different, is a monovalent hydrocarbon group free of an aliphatic unsaturated bond, and letter a is a positive number of 1.98 to 2.02, 0.1 to 100 mol % of the entire $R^3$ groups being phenyl groups. This phenyl group-containing organopolysiloxane serves as a coordinator between the silicone rubber and the carbon black to assist in dispersing the carbon black, permitting the carbon black to be blended in a more stable manner In formula (3), the aliphatic unsaturated bond-free hydrocarbon groups represented by $R^3$ are as exemplified for $R^1$. It is essential that 0.1 to 100 mol %, preferably 1 to 50 mol %, more preferably 2 to 30 mol % of the entire $R^3$ groups be phenyl groups. With less than 0.1 mol % of phenyl groups, the blending of this organopolysiloxane is ineffective It is noted that the other organopolysiloxane may be end-blocked with triorganosilyl groups such as trimethylsilyl and dimethylvinylsilyl or silanol groups.

Letter a is a positive number of 1.98 to 2.02. The organopolysiloxane of formula (3) should preferably be linear although a mixture of different molecular structures is acceptable. It may be in an oily or raw rubber state and preferably has an average degree of polymerization of about 2 to 20,000, especially about 3 to 10,000.

The amount of the phenyl-containing organopolysiloxane of formula (3) blended is 0.1 to 60 parts, preferably 1 to 40 parts by weight per 100 parts by weight of organopolysiloxane (A). Less than 0.1 part is too small for the phenyl-containing organopolysiloxane to become effective whereas more than 60 parts would detract from physical properties such as impact resilience.

The semiconductive silicone rubber composition according to the second aspect of the invention contains (A) an organopolysiloxane of formula (1), (B) thermal black and/or furnace black, (C) a curing agent, and (E) an antistatic agent in the form of an organopolysiloxane having an ionic group-bearing portion in a molecule.

Components (A) and (C) are the same as in the first embodiment.

Carbon black used as component (B) is also the same as in the first embodiment and selected from thermal black and furnace black having a primary particle diameter of at least 50 nm and a DBP oil absorption of up to 50 cc/100 g. The primary particle diameter is preferably 50 to 500 nm, and more preferably 70 to 400 nm. The DBP oil absorption is preferably up to 45 cc/100 g, and more preferably up to 40 cc/100 g. Commercially available examples include HTC 20 from Shin-Nikka Carbon K.K., and Asahi No. 15 from Asahi Carbon K.K.

The carbon black is blended in an amount of 2 to 100 parts, preferably 10 to 90 parts by weight per 100 parts by weight of organopolysiloxane (A). Less than 2 parts of carbon black fails to provide the composition with the desired electrical resistance Some compositions containing more than 100 parts of carbon black would be difficult to work with.

The composition of the second embodiment is characterized by the combined use of components (B) and (E). The antistatic agent as component (E) is an organopolysiloxane having an ionic group-bearing portion in a molecule, which serves in the silicone rubber to adsorb and polarize air-borne water molecules to exert electrical conductivity. This component supplements the electron conduction of carbon and reduces the voltage dependency of electrical resistance of silicone rubber. The ionic groups may be either cationic or anionic groups or a mixture thereof. Exemplary cationic groups are primary amine salts, secondary amine salts, tertiary amine salts, quaternary ammonium salts, and quaternary phosphonium salts. Exemplary anionic groups are groups of sulfonic acids (or salts), carboxylic acids (or salts), sulfates (or salts), and phosphates (or salts). The organopolysiloxane having an ionic group-bearing portion is commercially available as an antistatic agent for silicones, for example, under the trade name of SS101 and SS102 from Sanyo Chemicals K.K.

The semiconductive silicone rubber composition according to the third aspect of the invention is the same as that of the second embodiment except that a hydrocarbon insulating oil is blended as component (F) in addition to or instead of (E) antistatic agent.

The hydrocarbon insulating oil as component (F) may be either mineral or synthetic oil. Examples include naphthenic oils and terpene oils, and preferred examples are naphthene (or cycloparaffin) oils represented by $C_nH_{2n}$ wherein n is an integer of 3 to 8, and terpene oils represented by $(C_5H_8)_m$ wherein m is an integer of 2 to 8 such as monoterpene, sesquiterpene, diterpene and triterpene. A mixture of such oils is also acceptable. The terpene oil is commercially available under the trade name of Trans Oil from Showa Shell Petroleum K.K., for example. The hydrocarbon insulating oil has sufficiently high electrical insulating properties to prevent electrical short-circuiting between carbons in the silicone rubber under high voltages.

The antistatic agent (E) or the insulating oil (F) is blended in the composition in an amount of 0.1 to 10 parts, preferably 1 to 7 parts by weight per 100 parts by weight of organopolysiloxane (A). Less than 0.1 part would be too small for component (E) or (F) to exert its effect. Compositions containing more than 10 parts of component (E) or (F) would be difficult to work with.

It is understood that components (E) and (F) may be blended in the semiconductive silicone rubber composition comprising components (A) to (D) according to the first embodiment, for achieving similar advantages.

To the silicone rubber compositions according to the first to third embodiments of the invention, there may be added optional additives insofar as the object of the invention is not deterred. One useful additive is reinforcing silica powder. The reinforcing silica powder is blended for the purpose of providing the silicone rubber with improved mechanical strength. To this end, the reinforcing silica powder should preferably have a specific surface area of at least 50 $m^2/g$, and more preferably 100 to 300 $m^2/g$, as measured by the BET method. Silica with a specific surface area of less 50 $m^2/g$ would fail to impart mechanical strength to cured products. Examples of the reinforcing silica powder include fumed silica and precipitated silica, which may be surface treated with chlorosilane or hexamethyldisilazane to be hydrophobic The reinforcing silica powder is preferably blended in an amount of 5 to 70 parts, more preferably 10 to 50 parts by weight per 100 parts by weight of organopolysiloxane (A). Less than 5 parts would be too small to achieve reinforcement whereas more than 70 parts of reinforcing silica powder would adversely affect workability and rather invite a decline of mechanical strength.

Other optional additives include conductive inorganic oxides such as conductive zinc oxide, and extending fillers such as silicone rubber powder, red iron oxide, ground quartz and calcium carbonate.

Inorganic and organic blowing agents may be added if a sponge form is desirable. Exemplary blowing agents include azobisisobutyronitrile, dinitropentamethylenetetramine, benzenesulfonhydrazide and azodicarbonamide. The blowing agent may be used in an amount of about 1 to 10 parts by weight per 100 parts by weight of silicone rubber compound. By adding such a blowing agent to the inventive composition, a spongy silicone rubber can be produced.

If desired, various other additives such as coloring agents and heat resistance enhancers, reaction controlling agents, parting agents and filler dispersing agents may be added to the composition of the invention. Exemplary filler dispersing agents are diphenylsilane diol, alkoxysilanes, carbon functional silanes, and silanol group-containing low molecular weight siloxanes while the amount thereof added should be minimal so as not to detract from the benefits of the invention.

Furthermore, any of well known flame retardants and fire resistant agents may be added to the silicone rubber composition of the invention for rendering it flame retardant and fire resistant. Examples include platinum-containing materials, platinum compounds and titanium dioxide, platinum and manganese carbonate, platinum and gamma-$Fe_2O_3$, ferrite, mica, glass fibers, and glass flakes.

The silicone rubber composition of the invention is prepared by mixing the above-mentioned components in a rubber mastication machine such as a two-roll mill, Banbury mixer, and dough mixer or kneader, followed by optional heat treatment.

The thus obtained silicone rubber composition may be molded to a shape suitable for the intended application by any desired molding technique such as compression molding or extrusion molding. A roll shape of silicone rubber is most advantageous. Curing conditions may be properly selected in accordance with a particular curing method and the gage of a molded part and usually include 80 to 400° C. and 10 seconds to 30 days.

The semiconductive silicone rubber roll according to the invention is produced by molding the silicone rubber composition on a mandrel with or without an undercoat layer and curing the composition to form a cured layer. Conventional well-known techniques may be used for molding and curing.

There has been described a semiconductive silicone rubber composition which is stabilized against a change of resistivity under application of high voltages due to the inclusion of specific thermal black and/or furnace black. The composition is thus suitable as the roll material for business machines which must withstand the long-term service undergoing repetitive application of high voltages and especially provides a semiconductive silicone rubber roll material having a resistivity of $1 \times 10^3$ to $1 \times 10^{12}$ Ω-cm. This roll material finds use as charging rolls, transfer rolls and developing rolls.

EXAMPLE

Examples of the present invention are given below by way of illustration and not by way of limitation. All parts are by weight.

Examples 1–2

Using a roll mill, 100 parts of a rubbery organopolysiloxane consisting of 99.825 mol % of dimethylsiloxane units, 0.15 mol % of methylvinylsiloxane units, and 0.025 mol % of dimethylvinylsiloxane units and having an average degree of polymerization of about 5,000 was blended with the amount shown in Table 1 of furnace carbon black HTC20 having a primary particle diameter of 80 nm and a DBP oil absorption of 30 cc/100 g (Shin-Nikka Carbon K.K.) to form a base compound.

To 100 parts of the base compound were added 0.8 part of a curing agent Perbutyl BH (Shin-Etsu Chemical Co., Ltd.) and 1.5 parts of azobisisobutyronitrile (Shin-Etsu Chemical Co, Ltd.) as a blowing agent. Using an extruder having a diameter of 40 mm, the composition was extruded around a mandrel of 6 mm in diameter which had been surface treated with a primer 101A/B (Shin-Etsu Chemical Co., Ltd.). Subsequent heat treatment at 200° C. for 30 minutes yielded a foam roll. Using an abrasion machine, the roll was polished to a diameter of 12 mm, completing a semiconductive sponge roll.

The sponge roll was measured for resistivity as shown in FIG. 1. The sponge roll 1 having a mandrel 3 was placed between electrodes 2. Using a meter 4, the resistivity was measured by applying a voltage of 100 V, 1,000 V and 4,000 V between the electrode 2 and the mandrel 3. The meter 4 used was Trek 610C (manufactured by Trek Co., Ltd.). The results are shown in Table 1.

Example 3

A roll was prepared as in Example 1 except that 10 parts of a rubbery phenyl-containing organopolysiloxane consisting of 85.0 mol % of dimethylsiloxane units and 15.0 mol % of diphenylsiloxane units and having an average degree of polymerization of about 5,000 was further blended in the base compound of Example 1. Its resistivity was similarly measured, with the results shown in Table 1.

Comparative Examples 1–2

Rolls were prepared as in Example 1 except that acetylene black having a primary particle diameter of 40 nm and a DBP oil absorption of 110 cc/100 g (Denki Kagaku Kogyo K.K.) was used in the amounts shown in Table 1. Their resistivity was similarly measured, with the results shown in Table 1.

TABLE 1

| Components (pbw) | | E1 | E2 | E3 | CE1 | CE2 |
|---|---|---|---|---|---|---|
| Methylvinylpolysiloxane | | 100 | 100 | 100 | 100 | 100 |
| Phenyl-containing organopolysiloxane | | — | — | 10 | — | — |
| HTC20 | | 50 | 60 | 50 | — | — |
| Acetylene black | | — | — | — | 12 | 14 |
| Resistivity | @100 V | $1 \times 10^9$ | $1 \times 10^8$ | $5 \times 10^9$ | $8 \times 10^9$ | $9 \times 10^7$ |
| (Ω-cm) | @1000 V | $5 \times 10^8$ | $6 \times 10^7$ | $4 \times 10^9$ | $4 \times 10^8$ | $5 \times 10^6$ |
| | @4000 V | $2 \times 10^8$ | $3 \times 10^7$ | $3 \times 10^9$ | $5 \times 10^6$ | $3 \times 10^4$ |
| R100/R4000 | | 5.0 | 3.3 | 1.7 | 1600 | 3000 |

Example 4

A base compound was prepared by blending 100 parts of a rubbery organopolysiloxane consisting of 99.825 mol % of dimethylsiloxane units, 0.15 mol % of methylvinylsiloxane units, and 0.025 mol % of dimethylvinylsiloxane units and having an average degree of polymerization of about 5,000 with 4 parts of a silanol-terminated dimethylpolysiloxane having a degree of polymerization of 10 as a dispersant and 20 parts of treated silica having a specific surface area of 200 m$^2$/g (Nippon Aerosil K.K.) and heat treating the blend at 160° C. for 2 hours.

To 100 parts of the base compound was added 60 parts of furnace carbon black Asahi No. 15 having a primary particle diameter of 120 nm and a DBP oil absorption of 40 cc/100 g (Asahi Carbon K.K.).

This compound, 100 parts, was blended with 0.5 part of 2,5-dimethyl-2,5-di(t-butylperoxy)hexane as a curing agent. The thus obtained compound was compression molded around an aluminum mandrel of 6 mm in diameter to form a roll having a diameter of 12 mm (rubber gage 3 mm). The molding conditions included a temperature of 165° C., a pressure of 35 kgf/cm$^2$ and 10 minutes.

The roll was measured for resistivity as in Example 1, with the results shown in Table 2.

Comparative Example 3

A roll was prepared as in Example 4 except that 8 parts of conductive carbon Ketjen black EC having a primary particle diameter of 30 nm and a DBP oil absorption of 380 cc/100 g (Lion K.K.) was used instead of the carbon black used in Example 4. Its resistivity was similarly measured, with the results shown in Table 2.

TABLE 2

| Components (pbw) | | E4 | CE3 |
|---|---|---|---|
| Base compound | | 100 | 100 |
| Asahi No. 15 | | 60 | — |
| Ketjen black EC | | — | 10 |
| Resistivity | @100 V | $1 \times 10^8$ | $1 \times 10^7$ |
| (Ω-cm) | @1000 V | $5 \times 10^7$ | $2 \times 10^6$ |
| | @4000 V | $2 \times 10^7$ | $3 \times 10^4$ |
| R100/R4000 | | 5.0 | 33 |

Examples 5–6

A base compound was prepared by blending 100 parts of a rubbery organopolysiloxane consisting of 99.825 mol % of dimethylsiloxane units, 0.15 mol % of methylvinylsiloxane units, and 0.025 mol % of dimethylvinylsiloxane units and having an average degree of polymerization of about 5,000 with 4 parts of a silanol-terminated dimethylpolysiloxane having a degree of polymerization of 10 as a dispersant and 20 parts of treated silica having a specific surface area of 200 m$^2$/g (Nippon Aerosil K.K.) and heat treating the blend at 160° C. for 2 hours.

To 100 parts of the base compound were added 60 parts of furnace carbon black Asahi No. 15 having a primary particle diameter of 120 nm and a DBP oil absorption of 40 cc/100 g (Asahi Carbon K.K.) and 1 part of a phenylmethylsiloxane of the following formula (4) or 1 part of a dimethylsiloxane of the following formula (5).

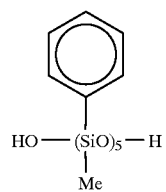

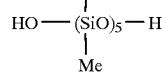

(4)

-continued

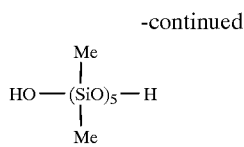
(5)

This compound, 100 parts, was blended with 0.5 part of 2,5-dimethyl-2,5-di(t-butylperoxy)hexane as a curing agent and 3 parts of a blowing agent KEP-13 (Shin-Etsu Chemical Co., Ltd.). The thus obtained compound was extruded and blown as in Example 1 to form a semiconductive sponge roll. The sponge roll was measured for resistivity as in Example 1, with the results shown in Table 3.

TABLE 3

| Components (pbw) | | E5 | E6 |
|---|---|---|---|
| Base compound | | 100 | 100 |
| Asahi No. 15 | | 60 | 60 |
| Phenylmethylsiloxane of formula (4) | | 1 | — |
| Dimethylsiloxane of formula (5) | | — | 1 |
| Resistivity | @100 V | $1 \times 10^8$ | $1 \times 10^8$ |
| ($\Omega$-cm) | @1000 V | $7 \times 10^7$ | $4 \times 10^7$ |
| | @4000 V | $5 \times 10^7$ | $2 \times 10^7$ |
| R100/R4000 | | 2.0 | 5.0 |

It is evident from Tables 1 to 3 that the silicone rubber rolls constructed of the cured semiconductive silicone rubber compositions within the scope of the invention have a stable resistivity in the semiconductive region.

Examples 7–8

Using a roll mill, 100 parts of a rubbery organopolysiloxane consisting of 99.825 mol % of dimethylsiloxane units, 0.15 mol % of methylvinylsiloxane units, and 0.025 mol % of dimethylvinylsiloxane units and having an average degree of polymerization of about 5,000 was blended with 80 parts of furnace carbon black HTC20 having a primary particle diameter of 80 nm and a DBP oil absorption of 30 cc/100 g (Shin-Nikka Carbon K.K.) and 0.5 part or 3 parts of an antistatic agent SS101 (an organopolysiloxane having an ionic group-containing portion in a molecule, Sanyo Chemicals K.K.) to form a base compound.

To 100 parts of the base compound were added 2 parts of a curing agent C-21 (Shin-Etsu Chemical Co., Ltd.) and 3 parts of a blowing agent KEP-13 (Shin-Etsu Chemical Co., Ltd.). Using an extruder having a diameter of 40 mm, the composition was extruded around a mandrel of 6 mm in diameter which had been surface treated with a primer 101A/B (Shin-Etsu Chemical Co., Ltd.). Subsequent heat treatment at 200° C. for 30 minutes yielded a foam roll. Using an abrasion machine, the roll was polished to a diameter of 12 mm, completing a semiconductive sponge roll.

The sponge roll was measured for resistivity as shown in FIG. 1. The sponge roll 1 having a mandrel 3 was placed between electrodes 2. Using a meter 4, the resistivity was measured by applying a voltage of 100 V, 1,000 V and 4,000 V between the electrode 2 and the mandrel 3. The meter 4 used was Trek 610C (manufactured by Trek Co., Ltd.). The results are shown in Table 4.

Comparative Examples 4–5

Rolls were prepared as in Example 7 except that 17 parts of acetylene black having a primary particle diameter of 40 nm and a DBP oil absorption of 110 cc/100 g (Denki Kagaku Kogyo K.K.) was used. Their resistivity was similarly measured, with the results shown in Table 4.

TABLE 4

| Components (pbw) | | E7 | E8 | CE4 | CE5 |
|---|---|---|---|---|---|
| Silicone polymer | | 100 | 100 | 100 | 100 |
| HTC20 | | 80 | 80 | 80 | — |
| Acetylene black | | — | — | — | 17 |
| SS101 | | 0.5 | 3 | — | 0.5 |
| Resistivity | @100 V | $1.0 \times 10^7$ | $1.0 \times 10^6$ | $8.0 \times 10^7$ | $9.0 \times 10^7$ |
| ($\Omega$-cm) | @1000 V | $5.0 \times 10^6$ | $6.0 \times 10^5$ | $3.0 \times 10^7$ | $8.0 \times 10^6$ |
| | @4000 V | $2.0 \times 10^6$ | $3.0 \times 10^5$ | $1.0 \times 10^7$ | $8.0 \times 10^5$ |
| R100/R4000 | | 5.0 | 3.3 | 8.0 | 113 |

Note that R100/R4000 is the resistivity at 100 V divided by the resistivity at 4,000 V.

Example 9 and Comparative Example 6

A base compound was prepared by blending 100 parts of a rubbery organopolysiloxane consisting of 99.825 mol % of dimethylsiloxane units, 0.15 mol % of methylvinylsiloxane units, and 0.025 mol % of dimethylvinylsiloxane units and having an average degree of polymerization of about 5,000 with 4 parts of a silanol-terminated dimethylpolysiloxane having a degree of polymerization of 10 as a dispersant and 20 parts of treated silica having a specific surface area of 200 $m^2/g$ (Nippon Aerosil K.K.) and heat treating the blend at 160° C. for 2 hours.

To 100 parts of the base compound were added 60 parts of furnace carbon black Asahi No. 15 having a primary particle diameter of 120 nm and a DBP oil absorption of 40 cc/100 g (Asahi Carbon K.K.) and 3.0 parts of an antistatic agent SS102 (Sanyo Chemicals K.K.).

This compound, 100 parts, was blended with 0.5 part of 2,5-dimethyl-2,5-di(t-butylperoxy)hexane as a curing agent. The thus obtained compound was compression molded around an aluminum mandrel of 6 mm in diameter to form a roll having a diameter of 12 mm (rubber gage 3 mm). The molding conditions included a temperature of 165° C., a pressure of 35 kgf/cm² and 10 minutes.

In Comparative Example 6, a roll was prepared as above, but using dimethylpolysiloxane oil KF96 (Shin-Etsu Chemical Co., Ltd.) instead of the antistatic agent SS102.

The rolls were measured for resistivity as in Example 7, with the results shown in Table 5.

TABLE 5

| Components (pbw) | | E9 | CE6 |
|---|---|---|---|
| Silicone polymer | | 100 | 100 |
| Asahi No. 15 | | 80 | 80 |
| SS102 | | 3.0 | — |
| KF96 | | — | 3.0 |
| Resistivity | @100 V | $1.0 \times 10^8$ | $8.0 \times 10^8$ |
| ($\Omega$-cm) | @1000 V | $6.0 \times 10^7$ | $2.0 \times 10^8$ |
| | @4000 V | $3.0 \times 10^7$ | $8.0 \times 10^7$ |
| R100/R4000 | | 3.3 | 10 |

Examples 10–11

Semiconductive sponge rolls were prepared as in Examples 7–8 except that 0.5 part or 3 parts of a terpene oil Trans Oil (Showa Shell Petroleum K.K.) was used instead of the antistatic agent SS101. The rolls were similarly measured for resistivity, with the results shown in Table 6.

TABLE 6

| Components (pbw) | | E10 | E11 |
|---|---|---|---|
| Silicone polymer | | 100 | 100 |
| HTC20 | | 80 | 80 |
| Trans Oil | | 0.5 | 3 |
| Resistivity | @100 V | $2.0 \times 10^7$ | $2.0 \times 10^6$ |
| ($\Omega$-cm) | @1000 V | $1.0 \times 10^7$ | $9.0 \times 10^5$ |
| | @4000 V | $4.0 \times 10^6$ | $6.0 \times 10^5$ |
| R100/R4000 | | 5.0 | 3.3 |

It is evident from Tables 4 to 6 that the silicone rubber rolls constructed of the cured semiconductive silicone rubber compositions within the scope of the invention have a stable resistivity in the semiconductive region.

Japanese Patent Application Nos. 150418/1997, 243359/1997 and 366501/1997 are incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A semiconductive silicone rubber composition comprising
   (A) 100 parts by weight of an organopolysiloxane having at least two aliphatic unsaturated groups in a molecule and represented by the following average compositional formula (1):

$$R^1{}_n SiO_{(4-n)/2} \quad (1)$$

wherein $R^1$, which may be identical or different, is a monovalent hydrocarbon group and letter n is a positive number of 1.98 to 2.02,
   (B) 2 to 200 parts by weight of thermal black and/or furnace black having a primary particle diameter of at least 50 nm and a DBP oil absorption of up to 50 cc/100 g, and
   (C) an amount to cure component (A) of a curing agent.

2. The semiconductive silicone rubber composition of claim 1 further comprising
   (D) 0.1 to 60 parts by weight of an organopolysiloxane represented by the following average compositional formula (3):

$$R^3{}_a SiO_{(4-a)/2} \quad (3)$$

wherein $R^3$, which may be identical or different, is a monovalent hydrocarbon group free of an aliphatic unsaturated bond, and letter a is a positive number of 1.98 to 2.02, 0.1 to 100 mol % of the entire $R^3$ groups being phenyl groups.

3. The semiconductive silicone rubber composition of claim 1 further comprising
   (E) 0.1 to 10 parts by weight of an antistatic agent in the form of an organopolysiloxane having an ionic group-bearing portion in a molecule.

4. The semiconductive silicone rubber composition of claim 1 further comprising
   (F) 0.1 to 10 parts by weight of a hydrocarbon insulating oil.

5. The semiconductive silicone rubber composition of claim 1 further comprising
   (G) 5 to 70 parts by weight of a reinforcing silica powder having a BET specific surface area of at least 50 m$^2$/g.

6. The semiconductive silicone rubber composition of claim 1 further comprising
   (H) 1 to 10 parts by weight of a blowing agent.

7. A semiconductive silicone rubber roll obtained by molding and curing the semiconductive silicone rubber composition of claim 1.

8. The semi-conductive silicone rubber roll of claim 7, which has a resistivity in the range of $1 \times 10^3$ to $1 \times 10^{12}$ $\Omega$-cm.

9. The semiconductive silicone rubber composition of claim 1, wherein, in formula (1), each $R^1$ is an alkyl, cycloalkyl, alkenyl, phenyl or tolyl group of 1-10 carbon atoms, each optionally substituted by halogen atoms.

10. The semiconductive silicone rubber composition of claim 1, wherein the aoganopolysiloxane, (A), has an average degree of polymerization of 100 to 20,000.

11. The semiconductive silicone rubber composition of claim 1, wherein the thermal black and/or furnace black, (B), has a primary particle diameter of 50-500 nm and a DBP oil absorption of 20-45 cc/100 g.

12. The semiconductive silicone rubber composition of claim 1, wherein the amount of the thermal black and/or furnace black, (B), in the composition is from 10 to 100 parts by weight per 100 parts by weight of the organopolysiloxane, (A).

13. The semiconductive silicone rubber composition of claim 2, wherein, in formula (3), each $R^3$ is an alkyl, cycloalkyl, phenyl or tolyl group of 1-10 carbon atoms, each optionally substituted by halogen atoms.

14. The semiconductive silicone rubber composition of claim 3, wherein the ionic group-bearing portion is a primary amine salt, secondary amine salt, tertiary amine salt, carboxylic acid, carboxylic acid salt, sulfate, sulfate salt, phosphate or phosphate salt group.

15. The semiconductive silicone rubber composition of claim 4, wherein the hydrocarbon insulating oil is a naphrhenic oil or terpene oil.

16. The semiconductive silicone rubber composition of claim 2, further comprising:
   (E) 0.1 to 10 parts by weight of an antistatic agent in the form of an organopolysiloxane having an ionic group-bearing portion in a molecule.

17. The semiconductive silicone rubber composition of claim 2, further comprising:
   (F) 0.1 to 10 parts by weight of a hydrocarbon insulating oil.

18. The semiconductive silicone rubber composition of claim 16, wherein the ionic group-bearing portion is a primary amine salt, secondary amine salt, tertiary amine salt, quaternary ammonium salt, quaternary phosphonium salt, sulfonic acid, sulfonic acid salt, carboxylic acid, carboxylic acid salt, sulfate, sulfate salt, phosphate or phosphare salt group.

19. The semiconductive silicone rubber composition of claim 17, wherein the hydrocarbon insulating oil is a naphrhenic oil or terpene oil.

* * * * *